United States Patent
Taniguchi (10) Patent No.: US 10,177,662 B2
(45) Date of Patent: Jan. 8, 2019

(54) BOOST CONVERTER APPARATUS

(71) Applicant: TOYOTA JIDOSHA KABUSHIKI KAISHA, Toyota-shi, Aichi-ken (JP)

(72) Inventor: Kazuya Taniguchi, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/911,427

(22) Filed: Mar. 5, 2018

(65) Prior Publication Data

US 2018/0262111 A1    Sep. 13, 2018

(30) Foreign Application Priority Data

Mar. 7, 2017   (JP) .................................. 2017-042778

(51) Int. Cl.
  *H02M 7/48*   (2007.01)
  *H02M 3/158*   (2006.01)
  (Continued)

(52) U.S. Cl.
  CPC ....... *H02M 3/1584* (2013.01); *B60L 11/1811* (2013.01); *H02M 3/1582* (2013.01); *B60L 2210/30* (2013.01); *B60L 2210/40* (2013.01); *B60L 2220/14* (2013.01); *B60L 2240/527* (2013.01); *H02M 2001/007* (2013.01); *H02M 2001/0012* (2013.01)

(58) Field of Classification Search
  CPC ................... H02M 1/44; H02M 5/458; H02M 2001/0029; H02M 7/49; H02M 3/158; H03K 17/163; B60W 20/10; B60W 1/1861; B60L 11/1861

USPC ................. 363/65, 71, 72, 95, 96, 132–135; 323/222, 225, 282–288
See application file for complete search history.

(56) References Cited

U.S. PATENT DOCUMENTS

| 8,498,136 B2 * | 7/2013 | Shinomoto | ......... H02M 1/4208 363/125 |
| 9,553,515 B2 * | 1/2017 | Ono | .................... B60L 11/1851 |

(Continued)

FOREIGN PATENT DOCUMENTS

| JP | 2007-274796 A | 10/2007 |
| JP | 2009-219299 A | 9/2009 |

(Continued)

*Primary Examiner* — Rajnikant Patel
(74) *Attorney, Agent, or Firm* — Sughrue Mion, PLLC (57) ABSTRACT

A first control device sends a common required carrier frequency, and a synchronizing signal that is synchronous with a first triangular wave, to a second control device. On satisfaction of a first condition that a carrier frequency of the first triangular wave is different from the required carrier frequency, the first control device changes the carrier frequency of the first triangular wave to value of the required carrier frequency. The second control device calculates a recognizing carrier frequency of the first triangular wave, based on the synchronizing signal. On satisfaction of second conditions that a carrier frequency of a second triangular wave is different from the recognizing carrier frequency and that the recognizing carrier frequency is equal to the required carrier frequency from the first control device, the second control device changes the carrier frequency of the second triangular wave to value of the required carrier frequency.

6 Claims, 7 Drawing Sheets

(51) Int. Cl.
*B60L 11/18* (2006.01)
*H02M 1/00* (2006.01)

(56) References Cited

U.S. PATENT DOCUMENTS

| | | | |
|---|---|---|---|
| 9,755,561 B2 * | 9/2017 | Jojima | H02J 7/0068 |
| 9,762,143 B2 * | 9/2017 | Matsuoka | H02M 7/493 |
| 2009/0230899 A1 | 9/2009 | Arimura et al. | |
| 2010/0296204 A1 * | 11/2010 | Ichikawa | B60K 6/445 |
| | | | 361/15 |
| 2012/0229061 A1 | 9/2012 | Itoh et al. | |

FOREIGN PATENT DOCUMENTS

| | | |
|---|---|---|
| JP | 2012-210138 A | 10/2012 |
| JP | 2016-119765 A | 6/2016 |

\* cited by examiner

BOOST CONVERTER APPARATUS

CROSS-REFERENCE TO RELATED APPLICATION

This application claims priority to Japanese Patent Application No. 2017-042778 filed on Mar. 7, 2017, the contents of which is incorporated herein by reference.

TECHNICAL FIELD

The present disclosure relates to a boost converter apparatus and more specifically relates to a boost converter apparatus equipped with two boost converters.

BACKGROUND

A proposed configuration of a boost converter apparatus includes a first voltage conversion unit and a second voltage conversion unit that are connected in parallel with each other relative to a DC battery and a load and that serve to boost an electric power from the DC battery and supply the boosted electric power to the load, and drives the first voltage conversion unit and the second voltage conversion unit in phases different from each other (as described in, for example, JP 2012-210138A). Such control of this boost converter apparatus reduces the ripple of the electric power supplied to the load.

CITATION LIST

Patent Literature

PTL 1: JP2012-210138A

SUMMARY

The boost converter apparatus is required to cause carrier frequencies of first and second triangular waves (carrier waves) used for control of the first voltage conversion unit and the second voltage conversion unit to be equal to each other (i.e., required to synchronize the first triangular wave and the second triangular wave with each other). In a configuration that the first voltage conversion unit and the second voltage conversion unit are controlled by one control device, synchronization of the first and the second triangular waves is readily achieved. In a configuration that the first voltage conversion unit and the second voltage conversion unit are controlled by separate control devices, however, this synchronization becomes a problem. When a first control device changes the carrier frequency of the first triangular wave, a second control device is required to similarly change the carrier frequency of the second triangular wave. In some cases, however, there may be a disturbance of the signal due to noise or the like in communication between the first control device and the second control device. The second control device thus needs to appropriately determine whether the carrier frequency of the second triangular wave is to be changed. The inappropriate determination is likely to cause a failure in appropriately synchronizing the first triangular wave and the second triangular wave with each other.

A boost converter apparatus of the present disclosure configured to control two boost converters by separate control devices mainly aims to appropriately synchronize two triangular waves used to control the respective boost converters with each other.

In order to achieve the above primary object, the boost converter apparatus of the disclosure is implemented by an aspect described below.

The present disclosure is directed to a boost converter apparatus. The boost converter apparatus includes a first boost converter configured to boost an electric power from a power storage device and supply the boosted electric power to an electric load, a second boost converter configured to boost an electric power from the power storage device or from a second power storage device that is different from the power storage device and supply the boosted electric power to the electric load, a first control device configured to control the first boost converter and a second control device configured to control the second boost converter. The first control device sends a common required carrier frequency that is shared by a first triangular wave and a second triangular wave and that is used to control the first boost converter and the second boost converter, and a synchronizing signal that is synchronous with the first triangular wave, to the second control device, and on satisfaction of a first condition that a carrier frequency of the first triangular wave is different from the required carrier frequency, the first control device changes the carrier frequency of the first triangular wave to value of the required carrier frequency, the second control device calculates a recognizing carrier frequency of the first triangular wave, based on the synchronizing signal from the first control device, and on satisfaction of second conditions that a carrier frequency of the second triangular wave is different from the recognizing carrier frequency and that the recognizing carrier frequency is equal to the required carrier frequency from the first control device, the second control device changes the carrier frequency of the second triangular wave to value of the required carrier frequency.

In the boost converter apparatus of the present disclosure, the first control device sends the common required carrier frequency that is shared by the first triangular wave and the second triangular wave and that is used to control the first boost converter and the second boost converter, and the synchronizing signal that is synchronous with the first triangular wave, to the second control device. On satisfaction of the first condition that the carrier frequency of the first triangular wave is different from the required carrier frequency, the first control device changes the carrier frequency of the first triangular wave to the value of the required carrier frequency. The second control device calculates the recognizing carrier frequency of the first triangular wave, based on the synchronizing signal from the first control device. On satisfaction of the second conditions that the carrier frequency of the second triangular wave is different from the recognizing carrier frequency and that the recognizing carrier frequency is equal to the required carrier frequency from the first control device, the second control device changes the carrier frequency of the second triangular wave to the value of the required carrier frequency. When both the synchronizing signal and the required carrier frequency from the first control device are normal (i.e., when there is no disturbance of the signal due to noise or the like in communication between the first control device and the second control device), this configuration enables the carrier frequency of the second triangular wave to be equal to the carrier frequency of the first triangular wave (i.e., synchronizes the first triangular wave and the second triangular wave with each other). When at least one of the synchronizing signal and the required carrier frequency from the first control device is abnormal (i.e., when there is a disturbance of the signal due to noise or the like in communication between the first control device and the second control device), on the other hand, this configuration suppresses the carrier frequency of the second triangular wave from being changed in appropriately. This accordingly suppresses a failure in appropriately synchronizing the first triangular wave and the second triangular wave with each other.

DESCRIPTION OF EMBODIMENTS

The following describes aspects of the present disclosure with reference to some embodiments.

Figure 1:
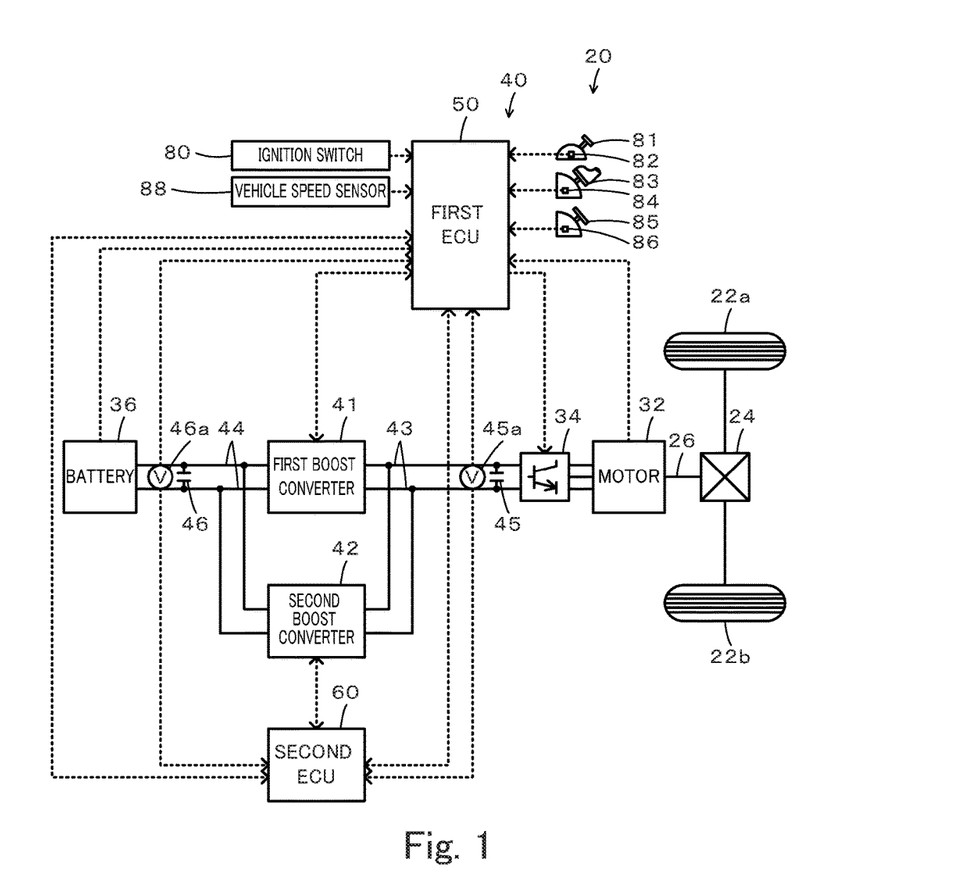
FIG. 1 is a configuration diagram illustrating the schematic configuration of an electric vehicle equipped with a boost converter apparatus according to one embodiment of the disclosure.
Figure 2:
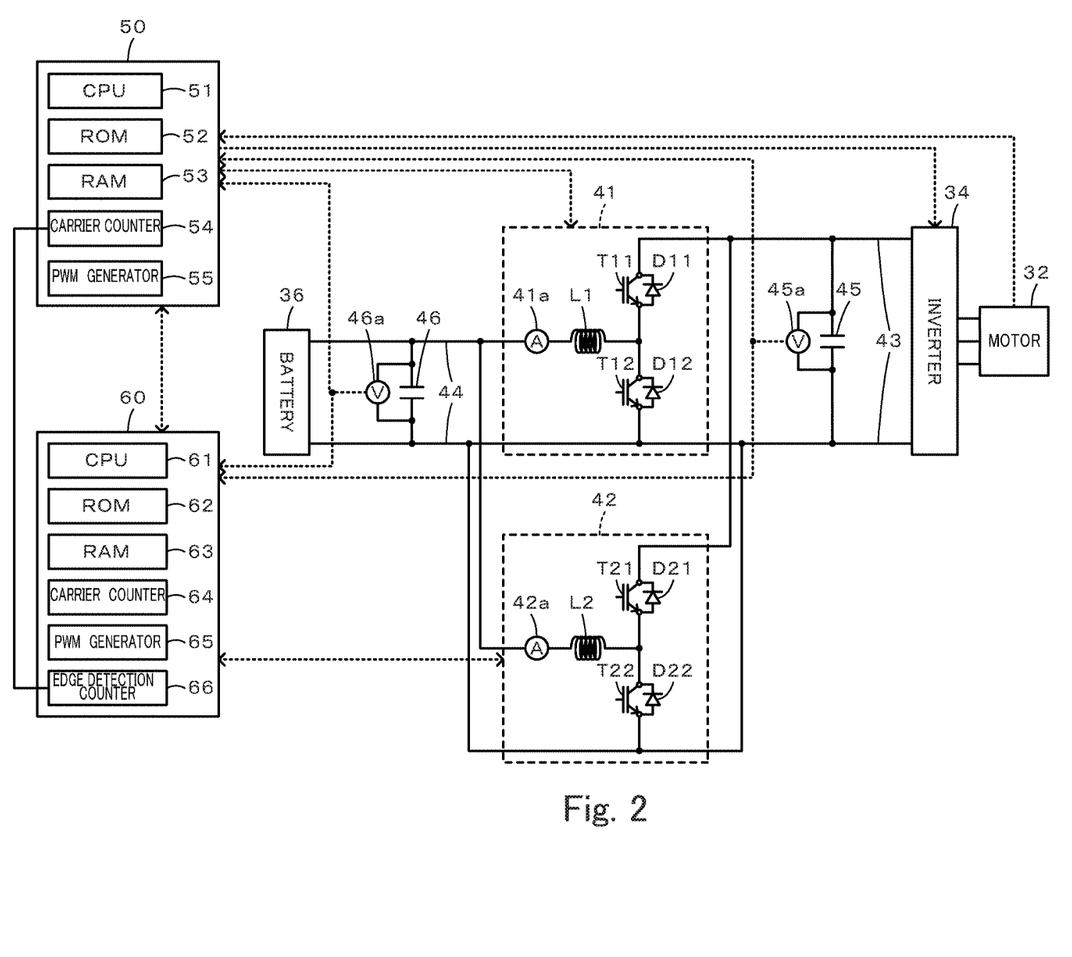
FIG. 2 is a configuration diagram illustrating the schematic configuration of the electric vehicle equipped with the boost converter apparatus according to the embodiment of the disclosure.

FIG. 1 and FIG. 2 are configuration diagrams illustrating the schematic configuration of an electric vehicle 20 equipped with a boost converter apparatus 40 according to one embodiment of the disclosure. As shown in FIGS. 1 and 2, the electric vehicle 20 of the embodiment includes a motor 32 as an electric load, an inverter 34, a battery 36 as a power storage device, first and second boost converters 41 and 42, and first and second electronic control units (hereinafter referred to as "ECUs") 50 and 60. The first and the second boost converters 41 and 42 and the first and the second ECUs 50 and 60 according to the embodiment mainly correspond to the "boost converter apparatus". The battery 36 corresponds to the "power storage device". And the motor 32 and the inverter 34 correspond to the "electric load".

The motor 32 is configured as, for example, a synchronous generator motor and includes a rotor connected with a driveshaft 26 that is coupled with drive wheels 22a and 22b via a differential gear 24. The inverter 34 is used to drive the motor 32 and is connected with high voltage-side power lines 43. The first ECU 50 performs switching control of a plurality of switching elements (not shown) included in the inverter 34, so as to rotate and drive the motor 32. A smoothing capacitor 45 is mounted to a positive electrode line and a negative electrode line of the high voltage-side power lines 43.

The battery 36 is configured as, for example, a lithium ion rechargeable battery or a nickel metal hydride battery and is connected with low voltage-side power lines 44. A smoothing capacitor 46 is mounted to a positive electrode line and a negative electrode line of the low voltage-side power lines 44.

The first boost converter 41 and the second boost converter 42 are connected with the high voltage-side power lines 43 and the low voltage-side power lines 44 to be parallel to each other. The first boost converter 41 includes two transistors T11 and T12, two diodes D11 and D12 respectively connected in parallel to the two transistors T11 and T12 and a reactor L1. The transistor T11 is connected with the positive electrode line of the high voltage-side power lines 43. The transistor T12 is connected with the transistor T11 and with the negative electrode lines of the high voltage-side power lines 43 and of the low voltage-side power lines 44. The reactor L1 is connected with a connection point between the transistors T11 and T12 and with the positive electrode line of the low voltage-side power lines 44. The first ECU 50 regulates the rates of ON times of the transistors T11 and T12, such that the first boost converter 41 steps up an electric power of the low voltage-side power lines 44 and supplies the stepped-up electric power to the high voltage-side power lines 43, while stepping down an electric power of the high voltage-side power lines 43 and supplying the stepped-down electric power to the low voltage-side power lines 44. Like the first boost converter 41, the second boost converter 42 includes two transistors T21 and T22, two diodes D21 and D22 and a reactor L2. The second ECU 60 regulates the rates of ON times of the transistors T21 and T22, such that the second boost converter 42 steps up an electric power of the low voltage-side power lines 44 and supplies the stepped-up electric power to the high voltage-side power lines 43, while stepping down an electric power of the high voltage-side power lines 43 and supplying the stepped-down electric power to the low voltage-side power lines 44.

The first ECU 50 is configured as a CPU 51-based microprocessor and includes a ROM 52, a RAM 53, a carrier counter 54, a PWM generator 55, input and output ports and a communication port, in addition to the CPU 51. The carrier counter 54 and the PWM generator 55 may be provided as hardware configuration or may be provided as software configuration. The details of the carrier counter 54 and the PWM generator 55 will be described later. Signals from various sensors are input into the first ECU 50 via the input port. The signals input into the first ECU 50 includes, for example, a rotational position θm from a rotational position detection sensor configured to detect the rotational position of the rotor of the motor 32 and electric currents Iu and Iv of respective phases of the motor 32 from current sensors configured to detect the electric currents flowing in the respective phases of the motor 32. The input signals also include a voltage Vb from a voltage sensor mounted between terminals of the battery 36 and an electric current Ib from a current sensor mounted to an output terminal of the battery 36. The input signals further include a voltage VH of the high voltage-side power lines 43 (capacitor 45) from a voltage sensor 45a mounted between terminals of the capacitor 45, a voltage VL of the low voltage-side power lines 44 (capacitor 46) from a voltage sensor 46a mounted between terminals of the capacitor 46, and an electric current IL1 of the reactor L1 from a current sensor 41a configured to detect the electric current flowing in the reactor L1 of the first boost converter 41. The input signals also include an ignition signal from an ignition switch 80 and a shift position SP from a shift position sensor 82 configured to detect an operating position of a shift lever 81. The input signals further include an accelerator position Acc from an accelerator pedal position sensor 84 configured to detect a depression amount of an accelerator pedal 83, a brake pedal position BP from a brake pedal position sensor 86 configured to detect a depression amount of a brake pedal 85, and a vehicle speed V from a vehicle speed sensor 88. Various control signals are output from the first ECU 50 via the output port. The signals output from the first ECU 50 include, for example, switching control signals to the plurality of switching elements included in the inverter 34 and control signals to the transistors T11 and T12 of the first boost converter 41. The first ECU 50 is connected with the second ECU 60 via a direct line or a communication line. The first ECU 50 calculates an electrical angle θe and a rotation speed Nm of the motor 32, based on the rotational position θm of the rotor of the motor 32 from the rotational position detection sensor 32a, and calculates a state of charge SOC of the battery 36, based on an integrated value of the electric current Ib of the battery 36 from the current sensor.

The second ECU 60 is configured as a CPU 61-based microprocessor and includes a ROM 62, a RAM 63, a carrier counter 64, a PWM generator 65, an edge detection counter 66, input and output ports and a communication port, in addition to the CPU 61. The carrier counter 64, the PWM generator 65 and edge detection counter 66 may be provided as hardware configuration or may be provided as software configuration. The details of the carrier counter 64, the PWM generator 65 and the edge detection counter 66 will be described later. Signals from various sensors are input into the second ECU 60 via the input port. The signals input into the second ECU 60 includes, for example, the voltage VH of the high voltage-side power lines 43 (capacitor 45) from the voltage sensor 45a mounted between the terminals of the capacitor 45, the voltage VL of the low voltage-side power lines 44 (capacitor 46) from the voltage sensor 46a mounted between the terminals of the capacitor 46, and an electric current IL2 of the reactor L2 from a current sensor 42a configured to detect the electric current flowing in the reactor L2 of the second boost converter 42. Various control signals are output from the second ECU 60 via the output port. The signals output from the second ECU 60 include, for example, control signals to the transistors T21 and T22 of the second boost converter 42. The second ECU 60 is connected with the first ECU 50 via the direct line or the communication line as described above.

In the electric vehicle 20 of the embodiment having the above configuration, the first ECU 50 sets a required torque Td* that is required for the driveshaft 26, based on the accelerator position Acc and the vehicle speed V, sets the set required torque Td* to a torque command Tm* of the motor 32, and performs switching control of the plurality of switching elements included in the inverter 34, so as to drive the motor 32 with the torque command Tm*.

The first ECU 50 also sets a target voltage VH* of the high voltage-side power lines 43, based on a target operation point (torque command Tm* and rotation speed Nm) of the motor 32. The first ECU 50 subsequently calculates a required output Pm* of the motor 32 by multiplying the torque command Tm* of the motor 32 by the rotation speed Nm, and sets a total target current IL* of the first and the second boost converters 41 and 42, based on the voltage VH and the target voltage VH* of the high voltage-side power lines 43 and the required output Pm* of the motor 32. The first ECU 50 then sets target currents IL1* and IL2* of the reactors L1 and L2 by multiplying the total target current IL* by distribution rates Dr1 and Dr2 (Dr1+Dr2=1) of the first and the second boost converters 41 and 42 (reactors L1 and L2), and sends the target current IL2* of the reactor L2 to the second ECU 60. The distribution rates Dr1 and Dr2 respectively denote electric current rates of the total target current IL* flowing between the low voltage-side power lines 44 and the high voltage-side power lines 43 via the first boost converter 41 (reactor L1) and via the second boost converter 42 (reactor L2). The distribution rate Dr1 may be, for example, 0.5.

After setting the target current IL1* of the reactor L1 of the first boost converter 41, the first ECU 50 sets a target duty ratio Du1* of the first boost converter 41, such as to make the electric current IL1 of the reactor L1 of the first boost converter 41 equal to the target current IL1*, generates PWM signals of the transistors T11 and T12 using the set target duty ratio Du1* and a first triangular wave (carrier wave) and performs switching control of the transistors T11 and T12. The PWM generator 55 performs generation and output of the PWM signals of the transistors T11 and T12.

When receiving the target current IL2* of the reactor L2 of the second boost converter 42 from the first ECU 50, the second ECU 60 sets a target duty ratio Du2* of the second boost converter 42, such as to make the electric current IL2 of the reactor L2 of the second boost converter 42 equal to the target current IL2*, generates PWM signals of the transistors T21 and T22 using the set target duty ratio Du2* and a second triangular wave (carrier wave) and performs switching control of the transistors T21 and T22. The PWM generator 65 performs generation and output of the PWM signals of the transistors T21 and T22.

The following describes operations of the electric vehicle 20 of the embodiment having the above configuration or more specifically series of operations to generate first and second triangular waves by the first ECU 50 and the second ECU 60. On a system start, the first ECU 50 and the second ECU 60 respectively start generation of the first triangular wave and the second triangular wave, in order to control the first boost converter 41 and the second boost converter 42. Generation of the first triangular wave and the second triangular wave is started, such that the first triangular wave and the second triangular wave have identical real carrier frequencies fc1 and fc2 and have a phase difference of 180 degrees (half cycle) or more specifically such that the timing of a crest (maximum value) of the first triangular wave is equal to the timing of a trough (minimum value) of the second triangular wave and the timing of a trough of the first triangular wave is equal to the timing of a crest of the second triangular wave. This aims to more effectively suppress a variation in electric current Ib of the battery 36 and a variation in voltage VH and a variation in electric current of the high voltage-side power lines 43. The following sequentially describes a series of operations to generate the first triangular wave by the first ECU 50 and a series of operations to generate the second triangular wave by the second EU 60.

Figure 3:
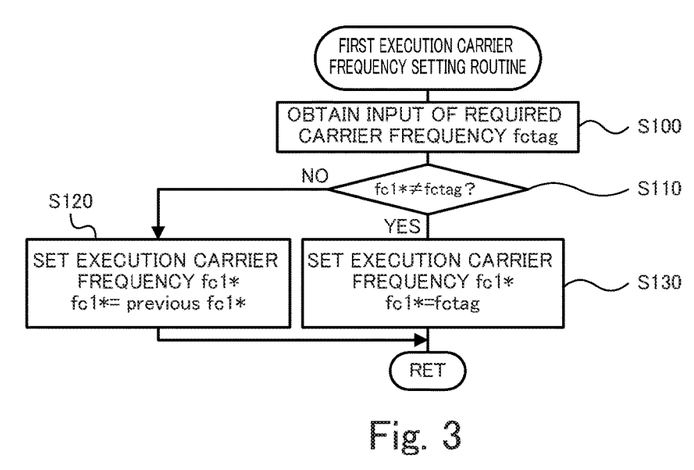
FIG. 3 is a flowchart showing one example of a first execution carrier frequency setting routine performed by a first ECU.

The operations of the first ECU 50 are described first. The CPU 51 of the first ECU 50 sets a common required carrier frequency fctag of the first and the second triangular waves, based on loads (for example, temperatures) of the first boost converter 41 and the second boost converter 42, and sends the set required carrier frequency fctag to the second ECU 60 via the communication line. The CPU 51 also performs a first execution carrier frequency setting routine of FIG. 3 to set an execution carrier frequency fc1* of the first triangular wave. The routine of FIG. 3 is triggered at the timing of each crest of the first triangular wave. The execution carrier frequency fc1* of the first triangular wave is a frequency used for generation of the first triangular wave by the carrier counter 54. The carrier counter 54 adjusts a real carrier frequency fc1 of the first triangular wave, based on the execution carrier frequency fc1* of the first triangular wave set by the routine of FIG. 3, and generates the first triangular wave. The carrier counter 54 also generates a synchronizing signal that is synchronous with the first triangular wave and sends the generated synchronizing signal to the carrier counter 64 of the second ECU 60 via the direct line. According to the embodiment, the synchronizing signal is changed over from a Lo level to a Hi level at the timing of a crest of the first triangular wave and is changed over from the Hi level to the Lo level at the timing of a trough of the first triangular wave. The following describes the first execution carrier frequency setting routine of FIG. 3.

When the first execution carrier frequency setting routine of FIG. 3 is triggered, the CPU 51 of the first ECU 50 obtains input data of the required carrier frequency fctag of the first and the second triangular waves (step S100) and compares a current value of the execution carrier frequency fc1* of the first triangular wave with the input required carrier frequency fctag of the first and the second triangular waves (step S110). When the current value of the execution carrier frequency fc1* of the first triangular wave is equal to the required carrier frequency fctag of the first and the second triangular waves, the CPU 51 keeps the execution carrier frequency fc1* of the first triangular wave unchanged (step S120) and terminates the routine. In this case, the carrier counter 54 keeps the real carrier frequency fc1 of the first triangular wave unchanged.

When the current value of the execution carrier frequency fc1* of the first triangular wave is different from the required carrier frequency fctag of the first and the second triangular waves at step S110, on the other hand, the CPU 51 sets the required carrier frequency fctag of the first and the second triangular waves to the execution carrier frequency fc1* of the first triangular wave (step S130) and terminates the routine. When the required carrier frequency fctag of the first and the second triangular waves is set to the execution carrier frequency fc1* of the first triangular wave, the carrier counter 54 sets the execution carrier frequency fc1* (=fctag) to the real carrier frequency fc1 of the first triangular wave at the timing of an immediate trough of the first triangular wave.

Figure 4:
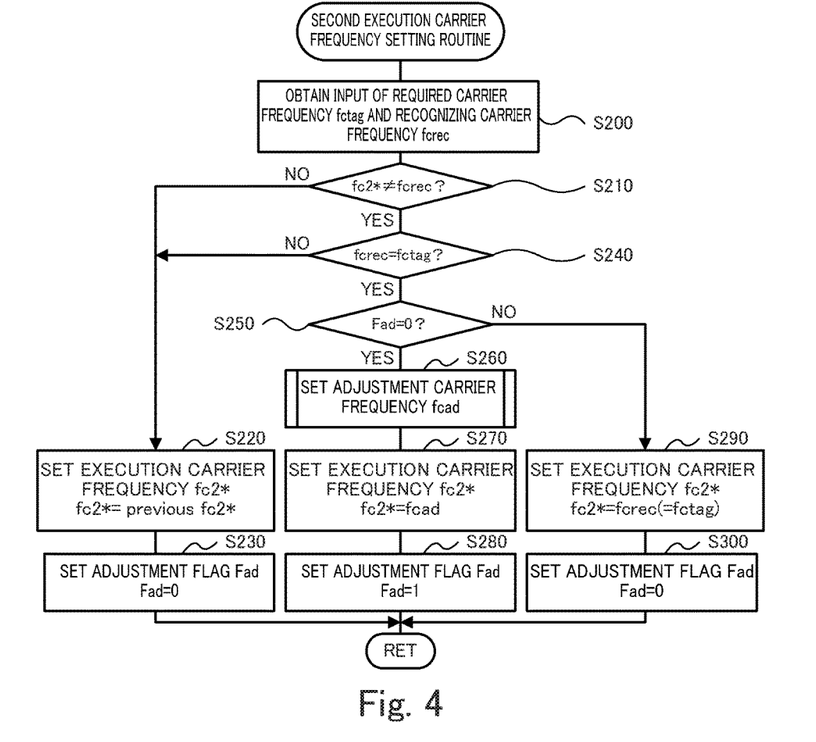
FIG. 4 is a flowchart showing one example of a second execution carrier frequency setting routine performed by a second ECU.

The operations of the second ECU 60 are described next. The CPU 61 of the second ECU 60 performs a second execution carrier frequency setting routine of FIG. 4 to set an execution carrier frequency fc2* of the second triangular wave. The routine of FIG. 4 is triggered at the timing of each crest of the second triangular wave. The execution carrier frequency fc2* of the second triangular wave is a frequency used for generation of the second triangular wave by the carrier counter 64. The carrier counter 64 adjusts a real carrier frequency fc2 of the second triangular wave, based on the execution carrier frequency fc2* of the second triangular wave set by the routine of FIG. 4, and generates the second triangular wave. The edge detection counter 66 detects an edge (changeover between the Lo level and the Hi level) of the synchronizing signal from the carrier counter 54 of the first ECU 50. The edge detection counter 66 also counts a duration time Tlo of the Lo level of the synchronizing signal, based on the synchronizing signal. More specifically, the edge detection counter 66 starts counting the duration time Tlo from a value 0 when the synchronizing signal is changed over from the Hi level to the Lo level, continues counting the duration time Tlo during the Lo level of the synchronizing signal, resets the duration time Tlo to the value 0 when the synchronizing signal is changed over from the Lo level to the Hi level, and keeps the duration time Tlo at the value 0 during the Hi level of the synchronizing signal. Furthermore, the edge detection counter 66 calculates a recognizing carrier frequency fcrec of the first triangular wave as a reciprocal of the last duration time Tlo at a timing when the duration time Tlo is reset to the value 0. The following describes the second execution carrier frequency setting routine of FIG. 4.

When the second execution carrier frequency setting routine of FIG. 4 is triggered, the CPU 61 of the second ECU 60 obtains input data of the required carrier frequency fctag of the first and the second triangular waves and the recognizing carrier frequency fcrec of the first triangular wave (step S200). The required carrier frequency fctag of the first and the second triangular waves is a value set by the first ECU 50 and input by communication. The recognizing carrier frequency fcrec of the first triangular wave is input as a value calculated by the edge detection counter 66.

After the data input, the CPU 61 compares a current value of the execution carrier frequency fc2* of the second triangular wave with the recognizing carrier frequency fcrec of the first triangular wave (step S210). When the current value of the execution carrier frequency fc2* of the second triangular wave is equal to the recognizing carrier frequency fcrec of the first triangular wave, the CPU 61 keeps the execution carrier frequency fc2* of the second triangular wave unchanged (step S220), sets a value 0 to an adjustment flag Fad that indicates whether the execution carrier frequency fc2* of the second triangular wave is under adjustment (step S230) and then terminates this routine. In this case, the carrier counter 64 keeps the real carrier frequency fc2 of the second triangular wave unchanged.

When the current value of the execution carrier frequency fc2* of the second triangular wave is different from the recognizing carrier frequency fcrec of the first triangular wave at step S210, on the other hand, the CPU 61 compares the recognizing carrier frequency fcrec of the first triangular wave with the required carrier frequency fctag of the first and the second triangular waves (step S240). This process determines whether both the synchronizing signal and the required carrier frequency fctag from the first ECU 50 are normal (i.e., whether there is any disturbance of the signal due to noise or the like in communication between the first ECU 50 and the second ECU 60).

When the recognizing carrier frequency fcrec of the first triangular wave is equal to the required carrier frequency fctag of the first and the second triangular waves at step S240, the CPU 61 determines that both the synchronizing signal and the required carrier frequency fctag from the first ECU 50 are normal and subsequently checks the setting of the adjustment flag Fad (step S250).

When the adjustment flag Fad is equal to the value 0 at step S250, the CPU 61 determines that the execution carrier frequency fc2* of the second triangular wave is not under adjustment and subsequently performs an adjustment carrier frequency setting process of FIG. 5 to set an adjustment carrier frequency fcad of the second triangular wave, based on the current value of the execution carrier frequency fc2* of the second triangular wave and the required carrier frequency fctag of the first and the second triangular waves (step S260). The adjustment carrier frequency setting process of FIG. 5 will be described later. The CPU 61 subsequently sets the adjustment carrier frequency fcad to the execution carrier frequency fc2* of the second triangular wave (step S270), sets a value 1 to the adjustment flag Fad (step S280) and then terminates the routine. When the adjustment carrier frequency fcad is set to the execution carrier frequency fc2* of the second triangular wave, the carrier counter 64 sets the execution carrier frequency fc2* (=fcad) to the real carrier frequency fc2 of the second triangular wave at the timing of an immediate trough of the second triangular wave.

When the adjustment flag Fad is equal to the value 1 at step S250, on the other hand, the CPU 61 determines that the execution carrier frequency fc2* of the second triangular wave is under adjustment. The CPU 61 sets the required carrier frequency fctag (=fcrec) of the first and the second triangular waves to the execution carrier frequency fc2* of the second triangular wave (step S290), sets the value 0 to the adjustment flag Fad (step S300), and then terminates this routine. When the required carrier frequency fctag of the first and the second triangular waves is set to the execution carrier frequency fc2* of the second triangular wave, the carrier counter 64 sets the execution carrier frequency fc2* (=fctag) to the real carrier frequency fc2 of the second triangular wave at the timing of an immediate trough of the second triangular wave.

When the execution carrier frequency fc2* of the second triangular wave is different from the recognizing carrier frequency fcrec of the first triangular wave and this recognizing carrier frequency fcrec is equal to the required carrier frequency fctag of the first and the second triangular waves, the real carrier frequency fc2 of the second triangular wave is set equal to the adjustment carrier frequency fcad and is then set equal to the required carrier frequency fctag of the first and the second triangular waves. This enables the real carrier frequency fc2 of the second triangular wave to be made equal to (to be synchronized with) the real carrier frequency fc1 of the first triangular wave.

When the recognizing carrier frequency fcrec of the first triangular wave is different from the required carrier frequency fctag of the first and the second triangular waves at step S240, the CPU 61 determines that at least one of the synchronizing signal and the required carrier frequency fctag from the first ECU 50 is abnormal. The CPU 61 keeps the execution carrier frequency fc2* of the second triangular wave unchanged (step S220), sets the value 0 to the adjustment flag Fad (step S230), and then terminates the routine. In this case, the carrier counter 64 keeps the real carrier frequency fc2 of the second triangular wave unchanged.

This suppresses the real carrier frequency fc2 of the second triangular wave from being inappropriately changed when at least one of the synchronizing signal and the required carrier frequency fctag from the first ECU 50 is abnormal (when there is a disturbance of the signal due to noise or the like in communication between the first ECU 50 and the second ECU 60). As a result, this suppresses a failure in appropriately synchronizing the first and the second triangular waves with each other.

Figure 5:
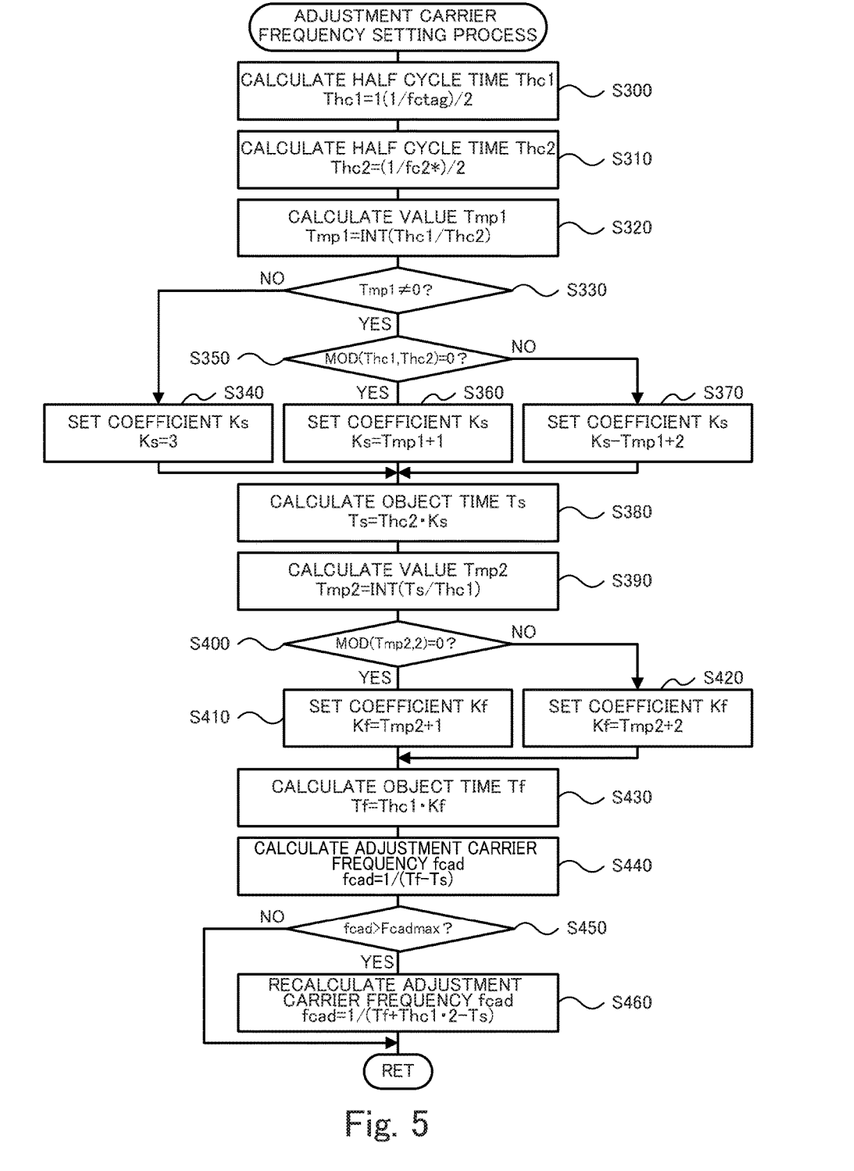
FIG. 5 is a flowchart showing one example of an adjustment carrier frequency setting process.
Figure 6:
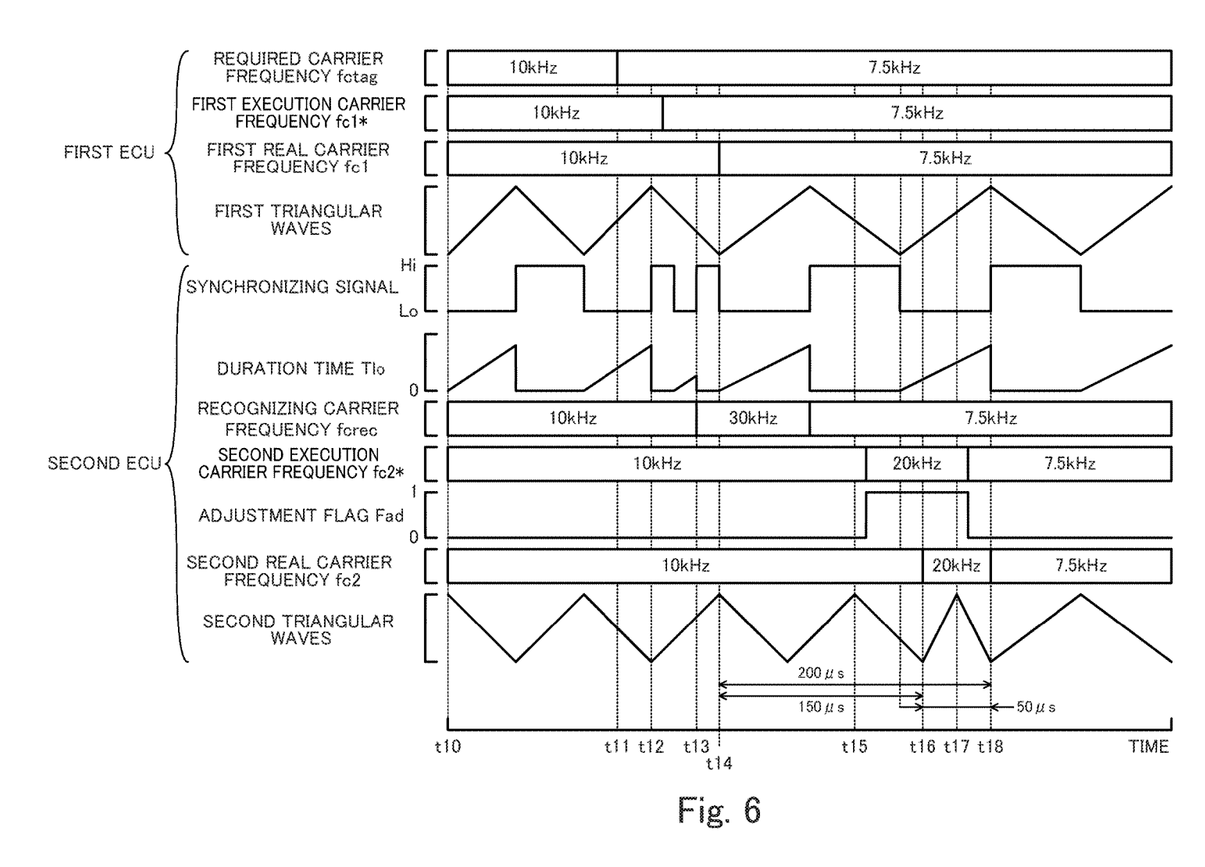
FIG. 6 is a diagram illustrating one example of a process of changing real carrier frequencies fc1 and fc2 of first and second triangular waves from 10 kHz to 7.5 kHz.

The following describes a process of changing the real carrier frequencies fc1 and fc2 of the first and the second triangular waves, prior to description of the adjustment carrier frequency setting process of FIG. 5. FIG. 6 is a diagram illustrating one example of a process of changing the real carrier frequencies fc1 and fc2 of the first and the second triangular waves from 10 kHz to 7.5 kHz. FIG. 6 shows variations in the required carrier frequency fctag of the first and the second triangular waves, the execution carrier frequency fc1* of the first triangular wave, the real carrier frequency fc1 of the first triangular wave, and the first triangular wave with regard to the first ECU 50. FIG. 6 also shows variations in the synchronizing signal from the first ECU 50, the duration time Tlo of the Lo level of the synchronizing signal, the recognizing carrier frequency fcrec of the first triangular wave, the execution carrier frequency fc2* of the second triangular wave, the adjustment flag Fad, the real carrier frequency fc2 of the second triangular wave, and the second triangular wave with regard to the second ECU 60. At a time t10, both the real carrier frequency fc1 of the first triangular wave and the real carrier frequency fc2 of the second triangular wave are 10 kHz and there is a phase difference of 180 degrees between the first triangular wave and the second triangular wave.

It is here assumed that the required carrier frequency fctag of the first and the second triangular waves is changed to 7.5 kHz (at a time t11). When the first ECU 50 starts the control routine of FIG. 3 at the timing of an immediate crest of the first triangular wave (at a time t12), the first ECU 50 changes the execution carrier frequency fc1* of the first triangular wave to the value of the required carrier frequency fctag (7.5 kHz). The first ECU 50 subsequently changes the real carrier frequency fc1 of the first triangular wave to the value of the execution carrier frequency fc1* (7.5 kHz) at the timing of an immediate trough of the first triangular wave (at a time t14).

When the second ECU 60 starts the control routine of FIG. 4 at the timing of a crest of the second triangular wave (at the time t14) immediately after the recognizing carrier frequency fcrec of the first triangular wave is changed to 30 kHz (at a time t13) due to abnormality of the synchronizing signal from the first ECU 50 (due to disturbance of the signal by noise or the like in communication), the second ECU 60 keeps the execution carrier frequency fc2* of the second triangular wave unchanged, since the execution carrier frequency fc2* of the second triangular wave (10 kHz) is different from the recognizing carrier frequency fcrec of the first triangular wave (30 kHz) and this recognizing carrier frequency fcrec (30 kHz) is different from the required carrier frequency fctag of the first and the second triangular waves (7.5 kHz). This suppresses the real carrier frequency fc2 of the second triangular wave from being changed inappropriately when the synchronizing signal from the first ECU 50 is abnormal (i.e., when there is disturbance of the signal due to noise or the like in communication between the first ECU 50 and the second ECU 60). As a result, this suppresses a failure in appropriately synchronizing the first triangular wave and the second triangular wave with each other. When the second ECU 60 starts the control routine of FIG. 4 at the timing of a next crest of the second triangular wave (at a time t15), the second ECU 60 changes the execution carrier frequency fc2* of the second triangular wave to the value of the adjustment carrier frequency fcad (20 kHz) and changes the adjustment flag Fad to the value 1, since the execution carrier frequency fc2* of the second triangular wave (10 kHz) is different from the recognizing carrier frequency fcrec of the first triangular wave (7.5 kHz) and this recognizing carrier frequency fcrec (7.5 kHz) is equal to the required carrier frequency fctag of the first and the second triangular waves (7.5 kHz). The second ECU 60 then changes the real carrier frequency fc2 of the second triangular wave to the value of the execution carrier frequency fc2* (20 kHz) at the timing of an immediate trough of the second triangular wave (at a time t16). When the second ECU 60 starts the control routine of FIG. 4 at the timing of a next crest of the second triangular wave (at a time t17), the second ECU 60 changes the execution carrier frequency fc2* of the second triangular wave to the value of the required carrier frequency fctag (7.5 kHz) and changes the adjustment flag Fad to the value 0. The second ECU 60 subsequently changes the real carrier frequency fc2 of the second triangular wave to the value of the execution carrier frequency fc2* (7.5 kHz) at the timing of an immediate trough of the second triangular wave (at a time t18). At the time t18, the adjustment carrier frequency fcad of the second triangular wave is set, such that the timing of a crest of the first triangular wave is matched with the timing of a trough of the second triangular wave. This setting then causes the real carrier frequencies fc1 and fc2 of the first and the second triangular waves to be both equal to 7.5 kHz and makes a phase difference of 180 degrees between the first and the second triangular waves (i.e., enables the first triangular wave and the second triangular wave to be appropriately synchronized with each other.) The following describes the process of setting the adjustment carrier frequency fcad (process of step S260 in FIG. 4) with reference to the adjustment carrier frequency setting process of FIG. 5.

In the adjustment carrier frequency setting process of FIG. 5, the second ECU 60 calculates a half cycle time Thc1 of the required carrier frequency fctag of the first and the second triangular waves according to Equation (1) (step S300) and calculates a half cycle time Thc2 of the current value of the execution carrier frequency fc2* of the second triangular wave (immediately before setting the adjustment carrier frequency fcad) according to Equation (2) (step S310):

$$Thc1 = (1/fctag)/2 \quad (1)$$

$$Thc2 = (1/fc2^*)/2 \quad (2)$$

The second ECU 60 subsequently sets the result of INT function "INT(Thc1/Thc2)" of the division of the half cycle time Thc1 by the half cycle time Thc2 as a value Tmp1 (step S320) and determines whether the set value Tmp1 is equal to value 0 (step S330). The INT function "INT(variable)" herein denotes a function of rounding off decimals of the variable. The process of step S330 determines which is longer, the half cycle time Thc1 or the half cycle time Thc2 (i.e., which is lower, the required carrier frequency fctag of the first and the second triangular waves or the execution carrier frequency fc2* of the second triangular wave). In this process, since the required carrier frequency fctag and the execution frequency fc2* are different from each other, the half cycle time Thc1 and the half cycle time Thc2 are different from each other.

When the value Tmp1 is equal to the value 0 at step S330, the second ECU 60 determines that the half cycle time Thc2 is longer than the half cycle time Thc1 (i.e., the execution carrier frequency fc2* of the second triangular wave is lower than the required carrier frequency fctag of the first and the second triangular waves). The second ECU 60 then sets a value 3 to a coefficient Ks (step S340) and calculates an object time Ts by multiplying the half cycle time Thc2 by the set coefficient Ks (step S380). The coefficient Ks is a value indicating how many durations of the half cycle time Thc2 are to be considered.

When the value Tmp1 is not equal to the value 0 at step S330, on the other hand, the second ECU 60 determines that the half cycle time Thc1 is longer than the half cycle time Thc2 (i.e., the required carrier frequency fctag of the first and the second triangular waves is lower than the execution carrier frequency fc2* of the second triangular wave). The second ECU 60 then determines whether the result of MOD function "MOD (Thc1, Thc2)" of the half cycle times Thc1 and Thc2 is equal to 0 (step S350). The MOD function "MOD variable 1, variable 2)" herein denotes a function of determining a remainder by division of the variable 1 by the variable 2. The process of step S350 determines whether the half cycle time Thc1 is an integral multiple (2 times, 3 times, . . . ) of the half cycle time Thc2.

When the result of MOD function "MOD (Thc1, Thc2)" is equal to the value 0 at step S350, i.e., when the half cycle time Thc1 is an integral multiple of the half cycle time Thc2, the second ECU 60 sets the sum of the value Tmp1 and value 1 to the coefficient Ks (step S360) and calculates the object time Ts by multiplying the half cycle time Thc2 by the set coefficient Ks (step S380). When the result of MOD function "MOD(Thc1, Thc2)" is not equal to the value 0 at step S350, i.e., when the half cycle time Thc1 is not an integral multiple of the half cycle time Thc2, on the other hand, the second ECU 60 sets the sum of the value Tmp1 and value 2 to the coefficient Ks (step S370) and calculates the object time Ts by multiplying the half cycle time Thc2 by the set coefficient Ks (step S380).

The second ECU 60 subsequently sets the result of INT function "INT(Ts/Thc1)" of the division of the object time Ts by the half cycle time Thc1 as a value Tmp2 (step S390) and determines whether the result of MOD function "MOD (Tmp2, 2)" of the value Tmp2 and the value 2 is equal to value 0 (step S400). The process of step S400 determines whether the object time Ts is an even multiple (2 times, 4 times, . . . ) of the half cycle time Thc1.

When the result of MOD function "MOD(Tmp2, 2)" is equal to the value 0 at step S400, the second ECU 60 sets the sum of the value Tmp2 and value 1 to a coefficient Kf (step S410) and calculates an object time Tf by multiplying the half cycle time Thc1 by the set coefficient Kf (step S430). When the result of MOD function "MOD (Tmp2, 2)" is not equal to the value 0 at step S400, on the other hand, the second ECU 60 sets the sum of the value Tmp2 and value 2 to the coefficient Kf (step S420) and calculates the object time Tf by multiplying the half cycle time Thc1 by the set coefficient Kf (step S430). The coefficient Kf is a value indicating how many durations of the half cycle time Thc1 are to be considered.

The second ECU 60 subsequently calculates the adjustment carrier frequency fcad from the object times Tf and Ts according to Equation (3) (step S440). The second ECU 60 compares the calculated adjustment carrier frequency fcad with an allowable upper limit carrier frequency fcadmax (step S450). When the adjustment carrier frequency fcad is equal to or lower than the allowable upper limit carrier frequency fcadmax, the second ECU 60 settles the adjustment carrier frequency fcad calculated at step S440 and then terminates this routine. When the adjustment carrier frequency fcad is higher than the allowable upper limit carrier frequency fcadmax, on the other hand, the second ECU 60 recalculates the adjustment carrier frequency fcad from the half cycle time Thc1 in addition to the object times Tf and Ts according to Equation (4) (step S460) and then terminates the routine.

$$fcad = 1/(Tf - Ts) \quad (3)$$

$$fcad = 1/(Tf + Thc1 \cdot 2 - Ts) \quad (4)$$

It is assumed that the required carrier frequency fctag of the first and the second triangular waves is equal to 7.5 KHz, the current value of the execution carrier frequency fc2* of the second triangular wave (immediately before setting the adjustment carrier frequency fcad) is equal to 10 kHz, and the allowable upper limit carrier frequency fcadmax is equal to 50 kHz (the same case as FIG. 6). In this case, the half cycle time Thc1 is calculated as "1/7.5 kHz/2=66.66 μsec" (step S300) and the half cycle time Thc2 is calculated as "1/10 kHz/2=50 μsec" (step S310). The value Tmp1 is calculated as "INT(66.66 μsec/50 μsec)=1" (step S320) and is thereby not equal to the value 0 (step S330), and the result of MOD(66.66 μsec, 50 μsec) is not equal to the value 0 (step S350). The coefficient Ks is accordingly set to "1+2=3" (step S370), and the object time Ts is calculated as "50 μsec·3=150 μsec" (step S380). The value Tmp2 is calculated as "INT(150 μsec/66.66 μsec)=2" (step S390), and the result of MOD (2, 2) is equal to the value 0 (step S400). The coefficient Kf is accordingly set to "2+1=3" (step S410), and the object time Tf is calculated as "66.66 μsec·3=200 μsec" (step S430). The adjustment carrier frequency fcad is accordingly calculated as "1/(200 μsec−150 μsec)=20 kHz" (step S440). This value is not higher than the allowable upper limit carrier frequency fcadmax (step S450), the adjustment carrier frequency fcad is settled as this value. In FIG. 6, the object time Ts is equivalent to 150 μsec (time duration t14 to t16), the object time Tf is equivalent to 200 μsec (time duration t14 to t18), and the adjustment carrier frequency fcad is equivalent to the reciprocal of 50 μsec (time duration t16 to t18). This means that setting the adjustment carrier frequency fcad by the adjustment carrier frequency setting process of FIG. 5 enables the adjustment carrier frequency fcad to be matched with the case of FIG. 6.

It is assumed that the required carrier frequency fctag of the first and the second triangular waves is equal to 15 KHz, the current value of the execution carrier frequency fc2* of the second triangular wave is equal to 10 kHz, and the allowable upper limit carrier frequency fcadmax is equal to 50 kHz. In this case, the half cycle time Thc1 is calculated as "1/15 kHz/2=33.33 μsec" (step S300) and the half cycle time Thc2 is calculated as "1/10 kHz/2=50 μsec" (step S310). The value Tmp1 is calculated as "INT(33.33 μsec/50 μsec)=0" (steps S320 and S330). The coefficient Ks is accordingly set to 3 (step S340), and the object time Ts is calculated as "50 μsec·3=150 μsec" (step S380). The value Tmp2 is calculated as "INT(150 μsec/33.33 μsec)=4" (step S390) and the result of MOD (4, 2) is equal to the value 0 (step S400). The coefficient Kf is accordingly set to "4+1=5" (step S410), and the object time Tf is calculated as "33.33 μsec·5=166.66 μsec" (step S430). The adjustment carrier frequency fcad is accordingly calculated as "1/(166.66 μsec−150 μsec)=60 kHz" (step S440). This value is higher than the allowable maximum carrier frequency fcadmax (step S450), so that the adjustment carrier frequency fcad is recalculated as "1/(166.66 μsec+33.33 μsec·2−150 μsec)=12 kHz" (step S460).

In the boost converter apparatus 40 mounted on the electric vehicle 20 of the embodiment described above, the first ECU 50 sends the required carrier frequency fctag of the first and the second triangular waves and the synchronizing signal synchronous with the first triangular wave to the second ECU 60. On satisfaction of the first condition that the execution carrier frequency fc1* of the first triangular wave is different from the required carrier frequency fctag, the first ECU 50 changes the execution carrier frequency fc1* of the first triangular wave to the value of the required carrier frequency fctag and changes the real carrier frequency fc1 of the first triangular wave to the value of the execution carrier frequency fc1*. On satisfaction of the second conditions that the execution carrier frequency fc2* of the second triangular wave is different from the recognizing carrier frequency fcrec of the first triangular wave based on the synchronous signal and that this recognizing carrier frequency fcrec is equal to the required carrier frequency fctag of the first and the second triangular waves, the second ECU 60 changes the execution carrier frequency fc2* of the second triangular wave to the value of the required carrier frequency fctag and changes the real carrier frequency fc2 of the second triangular wave to the value of the execution carrier frequency fc2*. When both the synchronizing signal and the required carrier frequency fctag from the first ECU 50 are normal (i.e., when there is no disturbance of the signal due to noise or the like in communication between the first ECU 50 and the second ECU 60), this causes the real carrier frequency fc2 of the second triangular wave to be equal to the real carrier frequency fc1 of the first triangular wave (i.e., synchronizes the first triangular wave and the second triangular wave with each other). When at least one of the synchronizing signal and the required carrier frequency fctag from the first ECU 50 is abnormal (i.e., when there is a disturbance of the signal due to noise or the like in communication between the first ECU 50 and the second ECU 60), on the other hand, this suppresses the real carrier frequency fc2 of the second triangular wave from being changed inappropriately. This accordingly suppresses a failure in appropriately synchronizing the first and the second triangular waves with each other.

Additionally, in the boost converter apparatus 40 mounted on the electric vehicle 20 of the embodiment, on satisfaction of the second conditions, the second ECU 60 changes the execution carrier frequency fc2* of the second triangular wave to the value of the adjustment carrier frequency fcad for a time duration of one cycle of the second triangular wave and subsequently to the value of the required carrier frequency fctag. This makes a phase difference of 180 degrees between the first triangular wave and the second triangular wave. In this case, appropriately setting the adjustment carrier frequency fcad makes a phase difference of 180 degrees between the first triangular wave and the second triangular wave and thereby further suppresses a variation in the electric current Ib of the battery 36 and variations in the voltage VH and electric current of the high voltage-side power lines 43.

In the boost converter apparatus 40 mounted on the electric vehicle 20 of the embodiment, in the adjustment carrier frequency setting process of FIG. 5, the second ECU 60 calculates the adjustment carrier frequency fcad according to Equation (3) given above (step S440). When the calculated adjustment carrier frequency fcad is higher than the allowable upper limit carrier frequency fcadmax (step S450), the second ECU 60 recalculates the adjustment carrier frequency fcad according to Equation (4) given above (step S460). A modification may not use the allowable upper limit frequency fcadmax and may skip the processes of steps S450 and S460.

In the boost converter apparatus 40 mounted on the electric vehicle 20 of the embodiment, in the adjustment carrier frequency setting process of FIG. 5, the second ECU 60 calculates the half cycle times Thc1 and Thc2 (steps S300 and S310) and calculates the object time Ts by multiplying the half cycle time Thc2 by the coefficient Ks that is according to the relationship between the half cycle times Thc1 and Thc2 (steps S320 to S380). The second ECU 60 calculates the object time Tf by multiplying the half cycle time Thc1 by the coefficient Kf that is according to the relationship between the object time Ts and the half cycle time Thc1 (steps S390 to S430) and calculates the adjustment carrier frequency fcad according to Equation (3) or according to Equation (4), based on the object time Ts and the object time Tf (steps S440 to S460). The adjustment carrier frequency fcad may, however, be set by a technique other than this technique. For example, a relationship between the current value of the execution carrier frequency fc2* of the second triangular wave, the required carrier frequency fctag of the first and the second triangular waves and the adjustment carrier frequency fcad may be determined in advance and stored as a map in the ROM 62 of the second ECU 60. The adjustment carrier frequency fcad corresponding to the given current value of the execution carrier frequency fc2* of the second triangular wave and the given required carrier frequency fctag of the first and the second triangular waves may be read from the map to be set.

In the boost converter apparatus 40 mounted on the electric vehicle 20 of the embodiment, on satisfaction of the second conditions, the second ECU 60 changes the execution carrier frequency fc2* of the second triangular wave to the value of the adjustment carrier frequency fcad for a time duration of one cycle of the second triangular wave and subsequently to the value of the required carrier frequency fctag. A modification may, however, change the execution carrier frequency fc2* of the second triangular wave to the value of the adjustment carrier frequency fcad for a time duration of two cycles or three cycles of the second triangular wave and subsequently to the value of the required carrier frequency fctag.

In the boost converter apparatus 40 mounted on the electric vehicle 20 of the embodiment, the first ECU 50 and the second ECU 60 serve to make a phase difference of 180 degrees between the first triangular wave and the second triangular wave. A modification may, however, make a phase difference of 0 degree or a phase difference of 90 degrees between the first triangular wave and the second triangular wave.

In the boost converter apparatus 40 mounted on the electric vehicle 20 of the embodiment, the first ECU 50 and the second ECU 60 serve to make a predetermined phase difference between the first triangular wave and the second triangular wave, while causing the real carrier frequency fc1 of the first triangular wave to be equal to the real carrier frequency fc2 of the second triangular wave. A modification may, however, cause the real carrier frequency fc1 of the first triangular wave to be equal to the real carrier frequency fc2 of the second triangular wave without considering the phase difference between the first triangular wave and the second triangular wave.

The electric vehicle 20 of the embodiment uses the battery 36 as the power storage device. The power storage device may, however, be any device that is capable of storing electricity, such as a capacitor.

Figure 7:
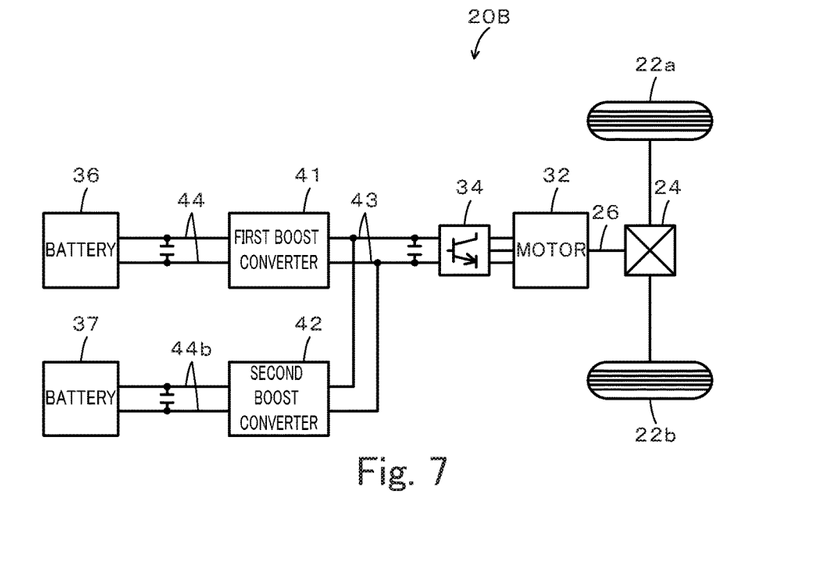
FIG. 7 is a configuration diagram illustrating the schematic configuration of an electric vehicle according to a modification.

The electric vehicle 20 of the embodiment is equipped with one battery 36 as the power storage device and is provided with the first boost converter 41 and the second boost converter 42 between the low voltage-side power lines 44 connected with the battery 36 and the high voltage-side power lines 43 connected with the inverter 34. As shown in a modification of FIG. 7, however, an electric vehicle 20B may be equipped with two batteries 36 and 37 as the power storage device and may be provided with a first boost converter 41 between low voltage-side power lines 44 connected with the battery 36 and high voltage-side power lines 43 connected with the inverter 34 and with a second boost converter 42 between low voltage-side power lines 44b connected with the battery 37 and the high voltage-side power lines 43. The electric vehicle 20 may use one capacitor, in place of the one battery 36. The electric vehicle 20B may use two capacitors, in place of the two batteries 36 and 37.

The above embodiment describes the configuration of the boost converter apparatus mounted on the electric vehicle 20 that is equipped with the motor 32 for driving. The disclosure may also be applied to the configuration of a boost converter apparatus mounted on an electric vehicle that is equipped with a plurality of motors and to the configuration of a boost converter apparatus mounted on a hybrid vehicle that is equipped with an engine in addition to a motor for driving. The disclosure may further be applied to the configuration of a boost converter apparatus mounted on a moving body other than the motor vehicle or to the configuration of a boost converter apparatus mounted on stationary equipment such as construction equipment.

In the boost converter apparatus of the present disclosure, on satisfaction of the second conditions, the second control device may cause the carrier frequency of the second triangular wave to be equal to the required carrier frequency and makes a predetermined phase difference between the first triangular wave and the second triangular wave. The "predetermined phase difference" may be, for example, 180 degrees. The predetermined phase difference of 180 degrees further suppresses variations in voltage and electric current of the high voltage-side power line. When both the first boost converter and the second boost converter are configured to boost an electric power from one identical power storage device and supply the boosted electric power to the electric load, the predetermined phase difference of 180 degrees further suppresses a variation in electric power of the power storage device.

In the boost converter apparatus of the present disclosure in which on the satisfaction of the second conditions, the second control device is configured so that the carrier frequency of the second triangular wave becomes the requested carrier frequency and the phase difference of the first and second triangular waves becomes the predetermined phase difference, on satisfaction of the second conditions, the second control device may change the carrier frequency of the second triangular wave to value of an adjustment carrier frequency for a time duration of a predetermined number of cycles of the second triangular wave and subsequently to value of the required carrier frequency, so as to make the predetermined phase difference between the first triangular wave and the second triangular wave, and the second control device sets the adjustment carrier frequency, so as to make the predetermined phase difference between the first triangular wave and the second triangular wave at a timing of changing the carrier frequency of the second triangular wave to the value of the required carrier frequency, based on the required carrier frequency and the carrier frequency of the second triangular wave on satisfaction of the second conditions. In this aspect, appropriately setting the adjustment carrier frequency makes a predetermined phase difference between the first triangular wave and the second triangular wave at the timing of changing the carrier frequency of the second triangular wave to the value of the required carrier frequency.

In the boost converter apparatus of the present disclosure in which on the satisfaction of the second conditions, the second control device is configured so that the carrier frequency of the second triangular wave becomes the requested carrier frequency and the phase difference of the first and second triangular waves becomes the predetermined phase difference, on satisfaction of the second conditions, the predetermined number of cycles is one cycle, and the second control device may calculate a first half cycle time that is a time of a half cycle of the required carrier frequency and a second half cycle time that is a time of a half cycle of the carrier frequency of the second triangular wave on satisfaction of the second conditions, the second control device calculates a first object time by multiplying the second half cycle time by a first coefficient that is according to a relationship between the first half cycle time and the second half cycle time, the second control device calculates a second object time by multiplying the first half cycle time by a second coefficient that is according to a relationship between the first object time and the first half cycle time, and the second control device calculates the adjustment carrier frequency as a reciprocal of subtraction of the first object time from the second object time. This configuration can appropriately set the adjustment carrier frequency.

In this case, when the adjustment carrier frequency calculated as the reciprocal of subtraction of the first object time from the second object time is higher than an allowable upper limit carrier frequency, the second control device may recalculate the adjustment carrier frequency as a reciprocal of subtraction of the first object time from a sum of the second object time and twice the first half cycle time. This configuration enables the adjustment carrier frequency to be not higher than the allowable upper limit carrier frequency.

In the boost converter apparatus of the above aspect, on satisfaction of the first condition that the carrier frequency of the first triangular wave is different from the required carrier frequency, the first control device may change an execution carrier frequency of the first triangular wave to value of the required carrier frequency and change a real carrier frequency of the first triangular wave to value of the execution carrier frequency of the first triangular wave at a timing of an immediate extreme value of the first triangular wave, and on satisfaction of the second conditions that the carrier frequency of the second triangular wave is different from the recognizing carrier frequency and that the recognizing carrier frequency is equal to the required carrier frequency, the second control device may change an execution carrier frequency of the second triangular wave to value of the required carrier frequency and change a real carrier frequency of the second triangular wave to value of the execution carrier frequency of the second triangular wave at a timing of an immediate extreme value of the second triangular wave. When the execution carrier frequencies of the first triangular wave and the second triangular wave are changed, this configuration enables the real carrier frequencies of the first triangular wave and the second triangular wave to be changed at an appropriate timing.

The following describes the correspondence relationship between the primary components of the embodiment and the primary components of the disclosure described in Summary. The first boost converter 41 of the embodiment corresponds to the "first boost converter", the second boost converter 42 corresponds to the "second boost converter", the first ECU 50 corresponds to the "first control device" and the second ECU 60 corresponds to the "second control device".

The correspondence relationship between the primary components of the embodiment and the primary components of the disclosure, regarding which the problem is described in Summary, should not be considered to limit the components of the disclosure, regarding which the problem is described in Summary, since the embodiment is only illustrative to specifically describes the aspects of the disclosure, regarding which the problem is described in Summary. In other words, the disclosure, regarding which the problem is described in Summary, should be interpreted on the basis of the description in the Summary, and the embodiment is only a specific example of the disclosure, regarding which the problem is described in Summary.

The aspect of the disclosure is described above with reference to the embodiment. The disclosure is, however, not limited to the above embodiment but various modifications and variations may be made to the embodiment without departing from the scope of the disclosure.

INDUSTRIAL APPLICABILITY

The disclosure is applicable to, for example, the manufacturing industries of boost converter apparatuses.

The invention claimed is:

1. A boost converter apparatus, comprising:
a first boost converter configured to boost an electric power from a power storage device and supply the boosted electric power to an electric load;
a second boost converter configured to boost an electric power from the power storage device or from a second power storage device that is different from the power storage device and supply the boosted electric power to the electric load;
a first control device configured to control the first boost converter; and
a second control device configured to control the second boost converter, wherein
the first control device sends a common required carrier frequency that is shared by a first triangular wave and a second triangular wave and that is used to control the first boost converter and the second boost converter, and a synchronizing signal that is synchronous with the first triangular wave, to the second control device, and
on satisfaction of a first condition that a carrier frequency of the first triangular wave is different from the required carrier frequency, the first control device changes the carrier frequency of the first triangular wave to value of the required carrier frequency,
the second control device calculates a recognizing carrier frequency of the first triangular wave, based on the synchronizing signal from the first control device, and
on satisfaction of second conditions that a carrier frequency of the second triangular wave is different from the recognizing carrier frequency and that the recognizing carrier frequency is equal to the required carrier frequency from the first control device, the second control device changes the carrier frequency of the second triangular wave to value of the required carrier frequency.

2. The boost converter apparatus according to claim 1, wherein on satisfaction of the second conditions, the second control device causes the carrier frequency of the second triangular wave to be equal to the required carrier frequency and makes a predetermined phase difference between the first triangular wave and the second triangular wave.

3. The boost converter apparatus according to claim 2, wherein on satisfaction of the second conditions, the second control device changes the carrier frequency of the second triangular wave to value of an adjustment carrier frequency for a time duration of a predetermined number of cycles of the second triangular wave and subsequently to value of the required carrier frequency, so as to make the predetermined phase difference between the first triangular wave and the second triangular wave, and
the second control device sets the adjustment carrier frequency, so as to make the predetermined phase difference between the first triangular wave and the second triangular wave at a timing of changing the carrier frequency of the second triangular wave to the value of the required carrier frequency, based on the required carrier frequency and the carrier frequency of the second triangular wave on satisfaction of the second conditions.

4. The boost converter apparatus according to claim 3, wherein the predetermined number of cycles is one cycle, and the second control device calculates a first half cycle time that is a time of a half cycle of the required carrier frequency and a second half cycle time that is a time of a half cycle of the carrier frequency of the second triangular wave on satisfaction of the second conditions, the second control device calculates a first object time by multiplying the second half cycle time by a first coefficient that is according to a relationship between the first half cycle time and the second half cycle time, the second control device calculates a second object time by multiplying the first half cycle time by a second coefficient that is according to a relationship between the first object time and the first half cycle time, and the second control device calculates the adjustment carrier frequency as a reciprocal of subtraction of the first object time from the second object time.

5. The boost converter apparatus according to claim 4, wherein when the adjustment carrier frequency calculated as the reciprocal of subtraction of the first object time from the second object time is higher than an allowable upper limit carrier frequency, the second control device recalculates the adjustment carrier frequency as a reciprocal of subtraction of the first object time from a sum of the second object time and twice the first half cycle time.

6. The boost converter apparatus according to claim 1, wherein on satisfaction of the first condition that the carrier frequency of the first triangular wave is different from the required carrier frequency, the first control device changes an execution carrier frequency of the first triangular wave to value of the required carrier frequency and changes a real carrier frequency of the first triangular wave to value of the execution carrier frequency of the first triangular wave at a timing of an immediate extreme value of the first triangular wave, and on satisfaction of the second conditions that the carrier frequency of the second triangular wave is different from the recognizing carrier frequency and that the recognizing carrier frequency is equal to the required carrier frequency, the second control device changes an execution carrier frequency of the second triangular wave to value of the required carrier frequency and changes a real carrier frequency of the second triangular wave to value of the execution carrier frequency of the second triangular wave at a timing of an immediate extreme value of the second triangular wave.

* * * * *